May 21, 1929.  C. J. DARR  1,713,952
STONE GATHERER
Filed June 29, 1927  2 Sheets-Sheet 1
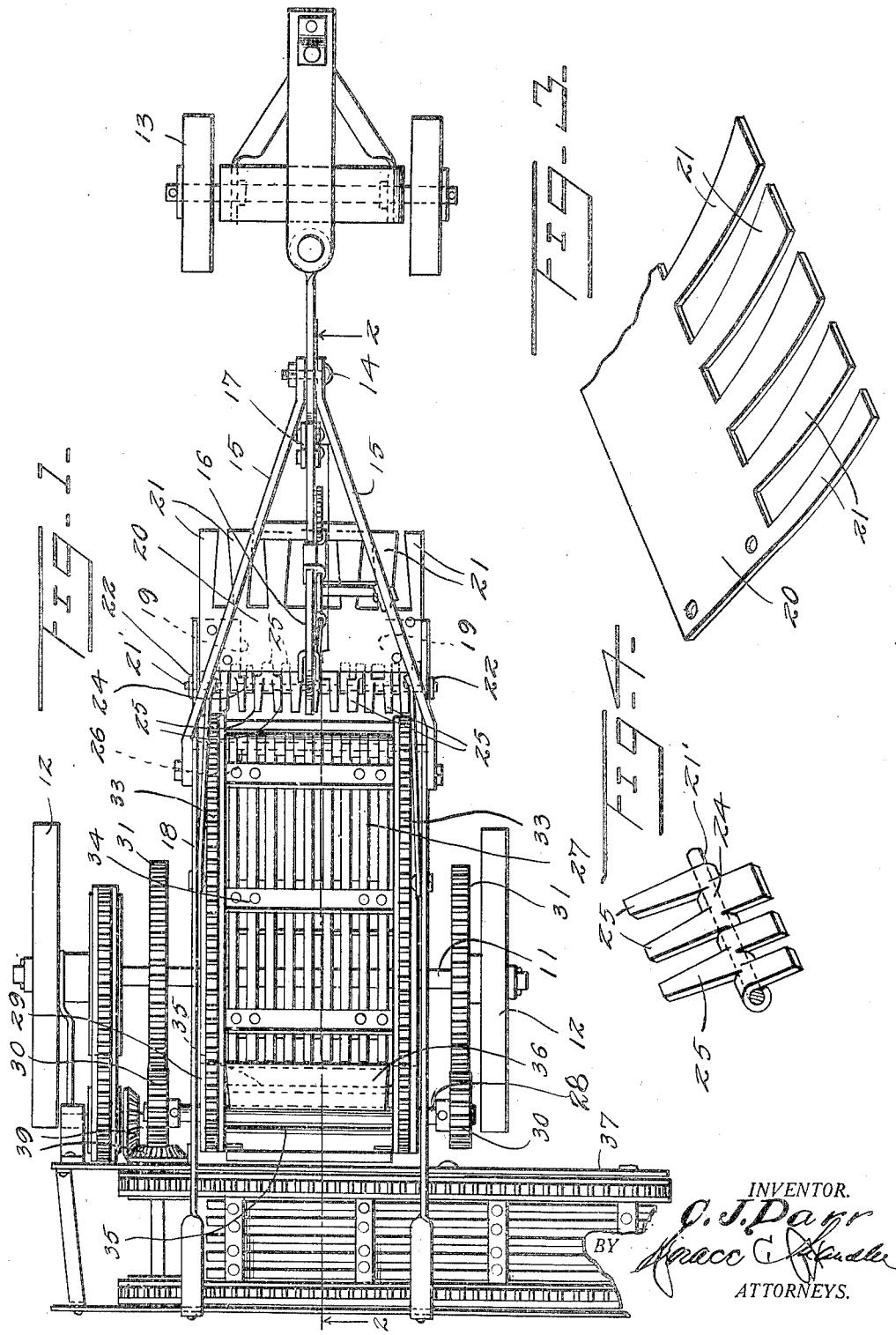

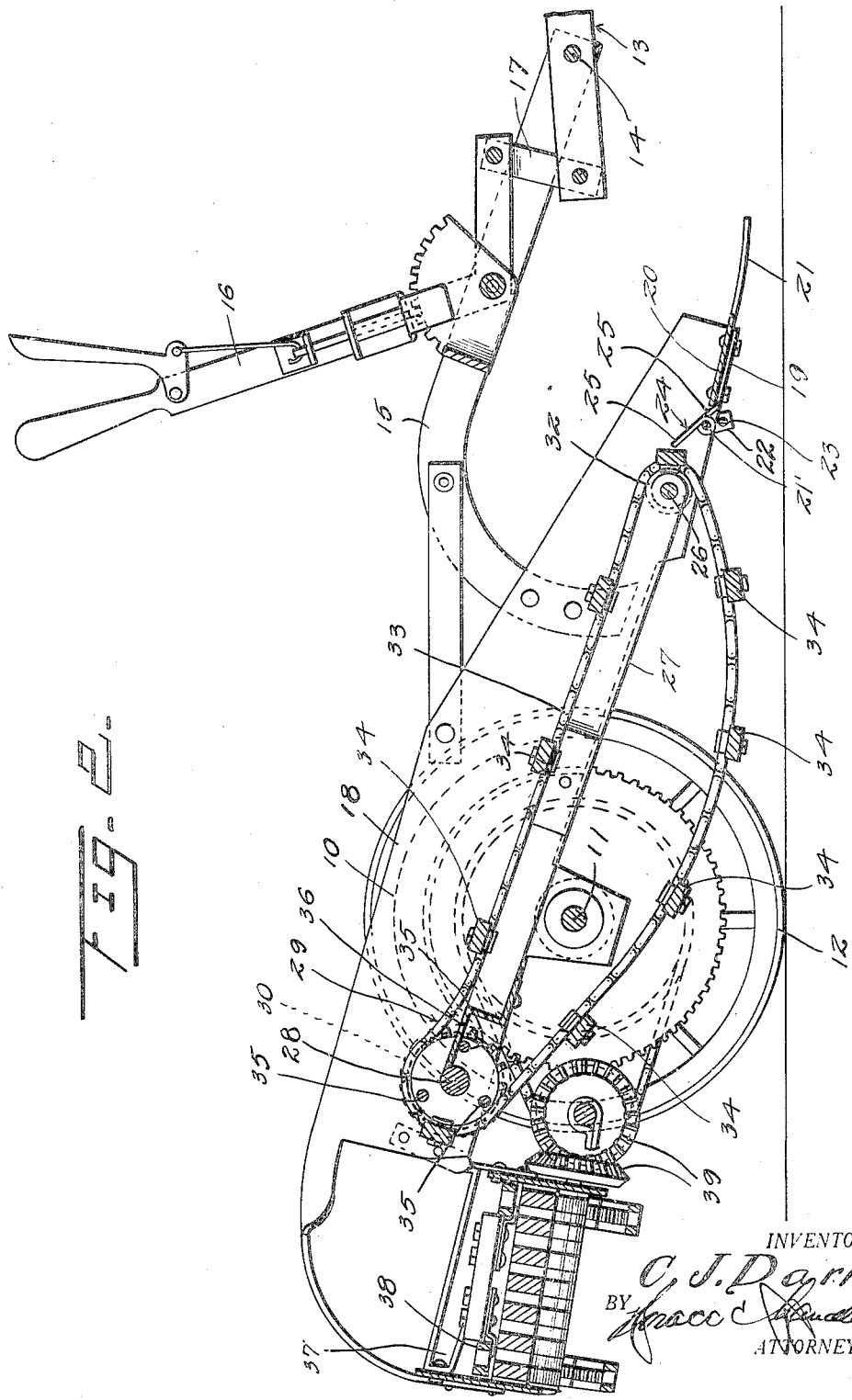

Patented May 21, 1929.

1,713,952

UNITED STATES PATENT OFFICE.

CLYDE J. DARR, OF SOMERSET, PENNSYLVANIA.

STONE GATHERER.

Application filed June 29, 1927. Serial No. 202,315.

This invention relates to new and useful improvements in gathering devices, and particularly to devices for gathering stones, from roads, fields, and the like.

One object of the present invention is to provide a stone gathering machine which is simple in construction and easy and effective in its operation.

Another object is to provide a machine of this character which includes novel means for preventing clogging by stones which roll back on the conveyor belt, and which means also serves to bridge the gap between the conveyor belt and the digging element.

Another object is to provide a machine of this character which includes a sifting screen, for separating the dirt from the stones, and novel means for shaking said screen.

Other objects and advantages will be apparent from the following description when taken in connection with the accompanying drawings.

In the drawings:

Figure 1 is a top plan view of a stone gathering machine, made in accordance with the present invention.

Figure 2 is a vertical longitudinal central sectional view on the line 2—2 of Figure 1.

Figure 3 is a detail perspective view of the digging element.

Figure 4 is a detail perspective view of a portion of the device for preventing clogging of the machine.

Referring particularly to the accompanying drawings, 10 represents a suitable frame having the transverse axle 11, provided with the ground wheels 12, for supporting the rear end of said frame. The front end of the frame is supported by the truck 13, which is pivotally connected thereto at 14, said pivotal connection being made with the forwardly converging arms or beams 15, carried by the said frame. A vertical lever 16 is mounted on said beams 15, and is pivotally connected with the truck by means of the link 17, whereby to elevate and depress the front end of the frame 10, for a purpose which will presently appear. The frame 10 carries the vertical longitudinal side plates 18, connected at their front ends by the transverse member 19. Removably secured on this member 19 is the forwardly and downwardly extending digging element or blade 20, said blade having tines 21 formed on its forward edge. It will be particularly noted that the openings between the tines are of greater width at their inner ends than at their outer ends, whereby to prevent clogging of the said spaces by grass and weeds, the wider inner ends readily permitting the escape of such grass and weeds. Disposed transversely of the frame, immediately in rear of the digging element or blade 20, is a shaft 21', the ends of which are supported in the side plates 18, and have the plates 22 on their ends outwardly of said side plates. A second transverse shaft or rod 23 is supported at its opposite ends in the plates 22, below the side plates 18, and so spaced therefrom as to permit the plates 22 to rock. It will be noted that the shaft 21' is disposed slightly above the rear or inner end of the digging blade 20. On this shaft are mounted a plurality of plates 24, each having vertical fingers 25, extending above the shaft, from a central hub portion, and the fingers 25, extending below the shaft, from said hub portion, the latter fingers being adapted to engage with the rod 23, when said plates are rocked rearwardly. The plates normally lie with their upper fingers extending across the space between the digging blade and the adjacent portion of the frame, whereby to close such space or gap. It will be noted that the frame 10 is inclined upwardly and rearwardly from the digging blade. Disposed transversely of the frame, and having its ends supported in the forward ends of the side plates 18, inwardly of the shaft 21', is a rod 26, which pivotally supports the lower end of the sifting screen 27, said screen extending rearwardly and upwardly to a point adjacent the rear end of said frame. A transverse shaft 28 is mounted in the said rear or upper end of the frame, and carries, inwardly of the side plates 18, the sprocket wheels 29, while outwardly of said plates the shaft carries the gears 30. Each of these gears 30 meshes with a large gear 31, secured to the inner face of a wheel 12, whereby said wheels drive said shaft 28. On the ends of the rod 26, inwardly of the side plates 18, are mounted rollers 32, and engaged around said rollers, and said sprocket wheels 29, are the chains 33, of an elevator, between which extend the flight bars 34, said chains being driven through the medium of the gears and the ground wheels, before-mentioned, the flight bars passing between the lower end of the screen 27, and the inner end of the digging blade 20, whereby to engage and carry the stones as they are delivered from the digger. Extending between the sprocket wheels 29, and having their opposite ends secured in said sprockets, are the bars 35, said bars being regularly spaced, as shown. To the upper end of the screen 27 there is secured a transversely extending plate 36, the outer edge portion of which is arranged to be engaged successively by the bars 35, whereby to lift the plate, and consequently the attached end of the screen, when the machine is in motion. As each bar 35 passes from beneath the plate 36 said plate and screen will drop, so that the dirt will be shaken from the stones, and such stones carried upwardly by the flight bars.

Mounted transversely of the rear of the frame 10, and inclined in a direction toward one side of the frame, is a chute 37, in which is mounted an endless conveyor 38, said conveyor being driven from the ground wheels, by means of the bevel gears 39.

The conveyor belts are in constant motion, as the machine proceeds, and as the digger lifts the stones and dirt, the stream of such elements will pass upwardly over the fingers of the plates 24, to be picked up by the flight bars 34, and carried upwardly to be deposited upon the transverse conveyor 38, from which conveyor the stones are dropped into a wagon, or cart, drawn along the side of the machine. As the machine proceeds the shaft 28 causes the rods or bars 35 to raise and drop the upper end of the screen, whereby to properly sift the dirt from the stones. Should a stone fall back between the lower end of the screen, and the plates 24, such stone will be lifted by the next flight bar coming upwardly, and one or more of the said plates swung backwardly, by said stone, according to the size of the stone, so that no clogging can occur in such space, which might cause a breakage of the flight bar, or other damage to the parts of the machine. Thus the combination of the plates 24 and the adjacent portion of the elevator 33 form a stone trap to catch and divert all stones which might tend to lodge at such point, so as to maintain the machine against clogging. All grass or weeds which might be lifted by the digger will pass between the tines of the digger, and be automatically released through the wider ends of the openings between such tines.

Attention is particularly directed to the fact that the lower fingers of the plates 24 abut against the lower rod 23, whereby to prevent said plates being completely turned over by a large or heavy stone.

What is claimed is:

In a stone gatherer including a digger and an elevator receiving from the digger and having transverse flight bars, a stone trap between the digger and elevator comprising a transverse shaft, a plurality of rockable plates each having a hub portion mounted on said shaft, and fingers on diametrically opposite sides of said hub portions, said fingers extending alternately in pairs and singly from one side of said shaft, and arranged in the path of said flight bars to be rocked thereby whereby to discharge stones lodging thereon.

In testimony whereof, I affix my signature.

CLYDE J. DARR.